(12) United States Patent
Beele

(10) Patent No.: US 7,071,411 B2
(45) Date of Patent: Jul. 4, 2006

(54) FIRE-RESISTANT SYSTEM AND METHOD FOR PASSING AT LEAST ONE CABLE, TUBE OR THE LIKE THROUGH THE OPENING IN A WALL

(75) Inventor: Johannes Alfred Beele, Aalten (NL)

(73) Assignee: Beele Engineering B.V., Aalten (NL)

(*) Notice: Subject to any disclaimer, the term of this patent is extended or adjusted under 35 U.S.C. 154(b) by 30 days.

(21) Appl. No.: 10/485,124

(22) PCT Filed: Aug. 6, 2002

(86) PCT No.: PCT/NL02/00529

§ 371 (c)(1),
(2), (4) Date: Jun. 24, 2004

(87) PCT Pub. No.: WO03/013658

PCT Pub. Date: Feb. 20, 2003

(65) Prior Publication Data

US 2004/0231880 A1 Nov. 25, 2004

(30) Foreign Application Priority Data

Aug. 7, 2001 (NL) .......................................... 1018722

(51) Int. Cl.
*H02G 3/18* (2006.01)

(52) U.S. Cl. ................ 174/65 G; 174/135; 174/152 G; 16/2.1

(58) Field of Classification Search ............... 174/65 G, 174/153 G, 152 G, 152 R, 135; 248/56; 16/2.1, 16/2.2; 439/604
See application file for complete search history.

(56) References Cited

U.S. PATENT DOCUMENTS

| | | | | |
|---|---|---|---|---|
| 3,206,539 A | * | 9/1965 | Kelly | 174/68.3 |
| 3,229,026 A | * | 1/1966 | Sulzer | 174/65 G |
| 5,465,759 A | | 11/1995 | Carlson et al. | 138/110 |
| 6,150,608 A | * | 11/2000 | Wambeke et al. | 174/65 G |
| 6,211,464 B1 | * | 4/2001 | Mochizuki et al. | 174/65 G |
| 6,486,400 B1 | * | 11/2002 | Smutny et al. | 174/65 G |

FOREIGN PATENT DOCUMENTS

| | | |
|---|---|---|
| DE | 37 24 744 | 2/1989 |
| DE | 197 25 301 | 1/1999 |
| EP | 0 534 563 | 3/1993 |

* cited by examiner

*Primary Examiner*—Dhiru R. Patel
(74) *Attorney, Agent, or Firm*—Moser, Patterson & Sheridan, L.L.P.

(57) ABSTRACT

A fire-resistant system for passing at least one cable, tube, or the like through an opening in a wall, which system having a fire-resistant sleeve member includes a continuous slit, which is at least partially arranged round said at least one cable, tube, or the like, and which is at least partially installed in said opening, characterized in that the sleeve member can be placed in a position in which longitudinal edges of said slit overlap permanently under material stress.

9 Claims, 1 Drawing Sheet

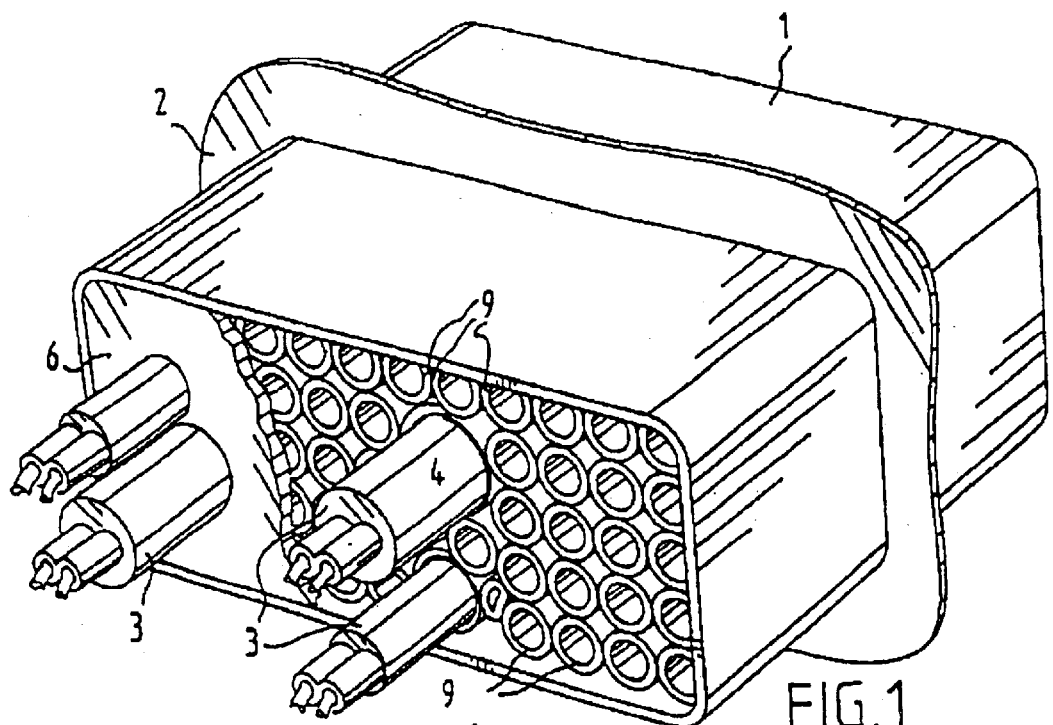
FIG.1
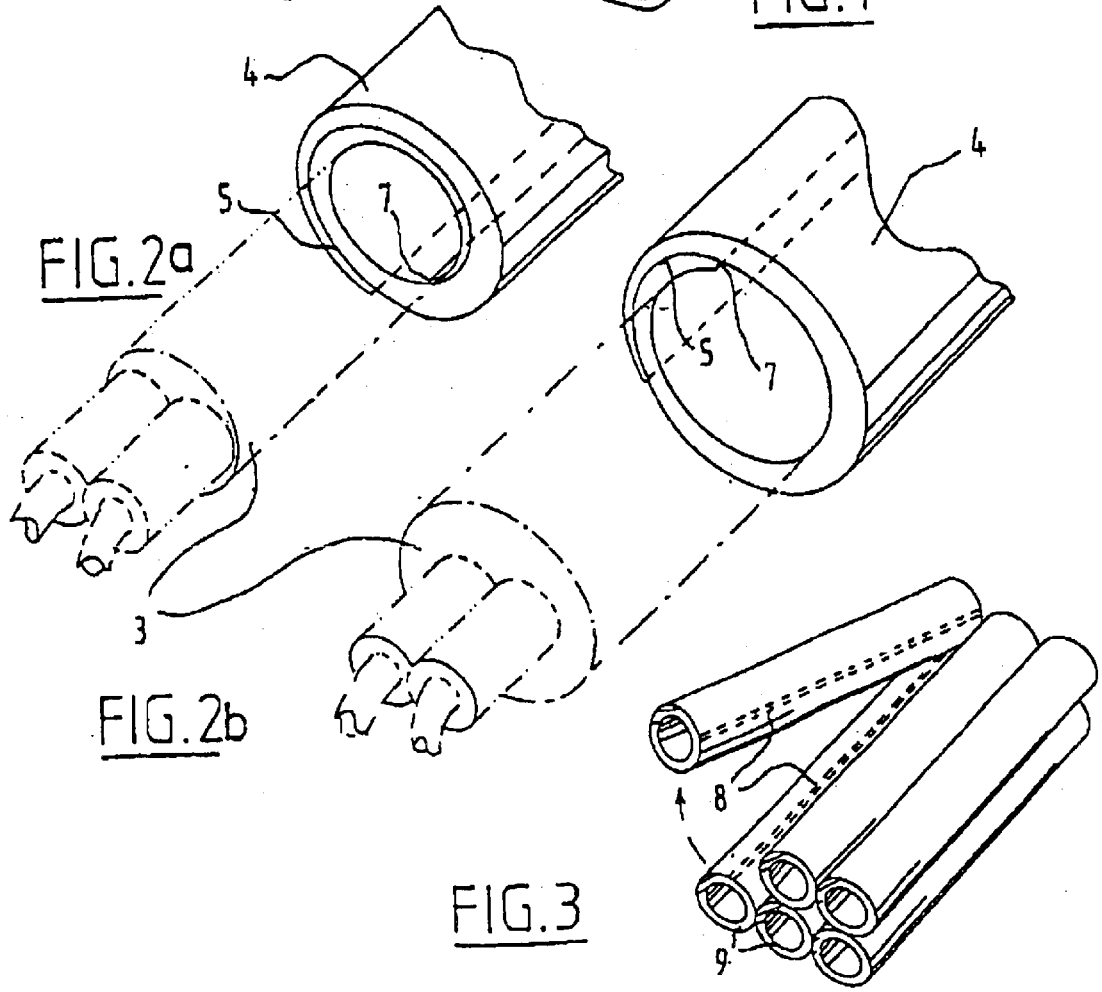
FIG.2a
FIG.2b
FIG.3

FIRE-RESISTANT SYSTEM AND METHOD FOR PASSING AT LEAST ONE CABLE, TUBE OR THE LIKE THROUGH THE OPENING IN A WALL

BACKGROUND OF THE INVENTION

1. Field of the Invention

The invention relates to a fire-resistant system for passing at least one cable, tube or the like through an opening in a wall. The invention also relates to a method for passing at least one cable, tube or the like through an opening in a wall, using the aforesaid system. Hereinafter, the term "wall" will be used for the sake of simplicity, whilst said term is understood to include other partitions as well, such as bulkheads, division plates and the like.

2. Description of the Related Art

Such a system and such a method are known from European patent publication No 0 534 563 of the present Applicant. The bushing system that is disclosed therein consists-of a steel bushing mounted in an opening in a wall, through which a number of cables, which may or may not be multiple cables, are passed. Each cable is enclosed in a rubber sleeve member or hose member, whilst the remaining space in the wall opening is filled with similar hose members. Finally, the wall opening is sealed with a suitable sealing putty. The hose members are provided with a continuous slit so as to make it easier to arrange the hose members round the cables that have already been drawn.

One drawback of this known system and this known method is that several sleeve members or hose members having varying diameters are required if various types of cables having varying diameters are passed through the opening in the wall. After all, each type of cable diameter requires its own corresponding type of hose member diameter. It stands to reason that the manufacture, the transport and the storage of various types of hose members is found to be laborious, whilst it must be determined upon installation at the building site which type of hose member fits which type of cable, which stands in the way of an efficient installation process.

SUMMARY OF THE INVENTION

The object of the invention is to improve the system disclosed in the aforesaid European patent specification in the sense that the drawbacks as indicated above are overcome.

In order to accomplish that objective, a bushing system of the kind referred to in the introduction is according to the invention characterized in that the sleeve member can be placed in a position in which longitudinal edges of said slit overlap permanently under material stress. The advantage of this is that one type of sleeve member or hose member will suffice in spite of the fact that different cable diameters are used. An important feature of the sleeve member, which is preferably made from a resilient material, is the fact the resilience of the material makes it possible to place the sleeve member in various positions, in which the extent to which the longitudinal edges of the continuous slit overlap varies with each different position. In other words, the effective diameter of the sleeve member can be varied by reducing or increasing the extent to which the longitudinal edges overlap in dependence on the diameter of a respective cable being passed through. It is noted that the term "permanent overlap" in this connection is understood to mean that the longitudinal edges of the continuous slit do not automatically spring back from the position in which they overlap to a position in which they no longer overlap and consequently lie opposite each other, for example due to stresses in the material. As already said before, the sleeve member or hose member can be deformed in such a manner that the longitudinal edges of the continuous slit take up a desired overlapping position and remain in that position, which position corresponds to a diameter of a respective cable passed through the wall opening. Several cables, tubes or the like may be drawn through by one hose member.

In one preferred embodiment of the system according to the invention, the longitudinal edges overlap 1–5 cm, in particular 2–4 cm. Experiments have shown that this makes it possible to use the sleeve member with practically any cable diameter.

In another preferred embodiment of a system according to the invention, the fire-resistant sleeve member is at least substantially made from a fire-resistant rubber. The rubber is an elastomer or a plastomer, in particular EVA rubber, EVA standing for Ethylene/Vinyl/Acetate. In a preferred variant, the fire-resistant rubber can expand under the influence of heat, so that a sufficient degree of "tightness" is realised in the opening. A further important advantage of said the expansion is the fact that a longer and thus more fire-resistant "bushing mass" is obtained.

In another preferred embodiment of a system according to the invention, several second fire-resistant sleeve members are provided, which sleeve members extend in the same direction as the first sleeve member arranged round said at least one cable, tube or the like and which fill the remaining space in the opening. As a result of the presence of said "fire-resistant filling means" a sufficient degree of air inclusion in the opening, and thus a high thermal insulation, is obtained. In particular, said first and said second sleeve members are identical, so that only one type of sleeve member or hose member is present at the building site, which facilitates and simplifies the installation of the present system considerably.

In another preferred embodiment of a system according to the invention, said second fire-resistant sleeve members are at least substantially made from a fire-resistant rubber, and they are bonded together. The rubber is preferably of the kind as already explained above with regard to the first sleeve member. The bonding together into one "unit" of the sleeve members functioning as "fillers" leads to the advantage that the remaining space in the opening does not need to be filled with the hose members one by one, but that said space can be filled with only one or a few "units", which considerably enhances the efficiency of the installation. This aspect of the invention-may also be applied independently of the specific embodiment of the aforesaid sleeve member, for example in the system disclosed in the aforesaid European patent publication No 0 534 563, and consequently it constitutes an invention that may be claimed separately.

In another preferred embodiment of a system according to the invention, a heat-resistant and/or liquid-repellent material is provided, which material is sealingly arranged on at least one open side of the opening. Said heat-resistant and/or liquid-repellent sealing putty enhances the liquid-tightness and gas-tightness of the system. Preferably, said putty is expandable under the influence of heat.

A method for passing at least one cable, tube or the like through an opening in a wall, using a system according to the invention, comprises the following steps:

passing said at least one cable, tube or the like through the opening, arranging a sleeve member comprising a continuous slit whose longitudinal edges overlap permanently under material stress at least in part round a portion of said at least one cable, tube or the like present, at least in part, in said opening.

The method preferably also comprises the step of filling the remaining space in the opening with second sleeve members or hose members, as well as the step of sealingly providing a heat-resistant and/or liquid-repellent material on at least one open side of the opening.

BRIEF DESCRIPTION OF THE DRAWINGS

The invention will now be explained in more detail with reference to figures illustrated in a drawing, in which:

FIG. 1 is a schematic, perspective view of a preferred variant of a system according to the invention;

FIGS. 2A–2B is a schematic, perspective view of a hose member used in the system of FIG. 1, which hose member is arranged round a cable being passed through; and FIG. 3 shows several bonded-together hose members used as fillers in the system of FIG. 1.

DETAILED DESCRIPTION OF THE PREFERRED EMBODIMENT

FIG. 1 shows a frame 1 which is mounted in an opening formed in a steel deck or bulkhead of a vessel. The frame 1 comprises a flange 2, which lies in the plane of the steel deck and which functions as a support. After the frame. 1 has been sealingly mounted in the opening, electric lines 3 having varying diameters are drawn through the frame 1. Following that, a sleeve 4 of a fire-resistant rubber according to the invention is arranged round each electric line 3. Said arranging of the round cables having varying diameters is easier when said one type of sleeve 4 is used, since the sleeves 4 are provided with a continuous slit 5, whose longitudinal edges 7 overlap, as will be explained in more detail yet with reference to FIG. 2. Then the remaining space in the frame 1 is filled with sleeves 9 of the same type of fire-resistant rubber. Finally, a heat-resistant and/or water-repellent sealing putty 6 is provided on both open sides of the frame 1. Said putty 6 has been selected because it has good bonding properties and because it will cure into a rubbery material within 24 hours as a result of the atmospheric humidity. Preferably, the putty 6 is expandable under the influence of fire. The heat-resistant and/or water-repellent putty 6 guarantees a watertight and gaslight bushing of the electric lines 3. It is noted that the sealing putty 6 is partially left out in FIG. 1 so as not to complicate FIG. 1 unnecessarily.

FIGS. 2A–2B shows that the effective diameter of a sleeve 4 can be adapted to the diameter of a respective electric line 3 by changing the degree of overlap of the longitudinal edges 7 accordingly. The resilience of the fire-resistant rubber is such that the longitudinal edges 7 will not automatically spring back when the desired degree of overlap is reached and will remain in said desired position, therefore. The distance by which the longitudinal edges overlap and along which the sleeve 4 has a double thickness, therefore, ranges in particular from 2 to 4 cm. In order to avoid said double thickness, it is preferred to make the longitudinal edges 7 conical, so that they will have a joint thickness equal to a normal thickness of the sleeve 4 in the position in which they overlap.

FIG. 3 shows a group of six bonded-together sleeves 9 forming one "unit", which function to fill the remaining space in the opening of the frame 1. This enables quicker and simpler filling of said space, since it is no longer necessary to place the sleeves into said space one by one as was previously the case. The sleeves 9 are provided with an adhesive at their contact surfaces 8 and do not have a continuous slit.

The invention is not limited to the preferred variant as shown, but it also extends to other variants that fall within the scope of the appended claims.

What is claimed is:

1. A fire-resistant system for passing at least one cable, tube or elongated member through an opening in a wall, which system comprises a fire-resistant sleeve member comprising a continuous slit, the fire-resistant sleeve member arranged at least in part round said at least one cable, tube or elongated member and the fire-resistant sleeve member installed at least in part in said opening, wherein the sleeve member can be placed in a position in which longitudinal edges of said slip overlap permanently under material stress.

2. The fire-resistant system according to claim 1, wherein the longitudinal edges overlap 1–5 centimeters.

3. The fire-resistant system according to claim 1, wherein the fire-resistant sleeve member is at least substantially made from a fire-resistant rubber.

4. The fire-resistant system according to claim 1, further comprising several second fire-resistant sleeve members, extending in the same direction as the first sleeve member and filling the remaining space in the opening.

5. The fire-resistant system according to claim 4, wherein said second fire-resistant sleeve members are at least substantially made from a fire-resistant rubber and said second fire-resistant sleeve members are bonded together.

6. The fire-resistant system according to claim 1, futher comprising a heat-resistant and liquid-repellant material, sealingly arranged on at least one open side of the opening.

7. A method for passing at least one cable, tube or elongated member through an opening in a wall, using a system according to according to claim 1, which method comprises the following steps:

passing said at least one cable, tube or through the opening, arranging a sleeve member comprising a continuous slit whose longitudinal edges overlap permanently under material stress at least in part round a part of said at least one cable, tube or elongated member, the sleeve member being present, at least in part, in said opening.

8. The fire-resistant system according to claim 1, further comprising a heat-resistant or liquid-repellant material sealingly arranged on at least one open side of the opening.

9.The fire-resistant system according to claim, wherein the longitudinal edges overlap 2–4 centimeters.

* * * * *